US008850251B1

(12) United States Patent
Maeng

(10) Patent No.: US 8,850,251 B1
(45) Date of Patent: Sep. 30, 2014

(54) METHODS, DEVICES, AND MEDIUMS ASSOCIATED WITH CONTROLLING A POWER MODE

(75) Inventor: Joon Maeng, Newcastle, WA (US)

(73) Assignee: Intellectual Ventures Fund 79 LLC, Las Vegas, NV (US)

( * ) Notice: Subject to any disclaimer, the term of this patent is extended or adjusted under 35 U.S.C. 154(b) by 627 days.

(21) Appl. No.: 13/009,698

(22) Filed: Jan. 19, 2011

(51) Int. Cl.
*G06F 1/00* (2006.01)

(52) U.S. Cl.
USPC .......................................... 713/323; 713/300

(58) Field of Classification Search
CPC ............... G06F 1/3203; G06F 1/3228; G09G 2330/021; H04W 52/0254
USPC .................................................. 713/300–340
See application file for complete search history.

(56) References Cited

U.S. PATENT DOCUMENTS

| | | | | |
|---|---|---|---|---|
| 5,375,245 A * | 12/1994 | Solhjell et al. | ................. | 713/320 |
| 5,768,604 A * | 6/1998 | Yamazaki et al. | ............ | 713/323 |
| 5,799,198 A * | 8/1998 | Fung | ............................. | 713/323 |
| 5,996,078 A * | 11/1999 | Christensen et al. | ......... | 713/300 |
| 6,076,169 A * | 6/2000 | Lee | ................................ | 713/320 |
| 6,266,714 B1 * | 7/2001 | Jacobs et al. | .................... | 710/14 |
| 6,384,853 B1 * | 5/2002 | Shaffer et al. | .................. | 715/867 |
| 6,404,447 B1 * | 6/2002 | Kitagawa | ...................... | 715/867 |
| 6,516,421 B1 * | 2/2003 | Peters | ........................... | 713/502 |
| 6,594,767 B1 * | 7/2003 | Wiley et al. | .................... | 713/300 |
| 7,089,508 B1 * | 8/2006 | Wright | ......................... | 715/867 |
| 7,698,586 B2 * | 4/2010 | Kim et al. | ...................... | 713/324 |
| 7,895,309 B2 * | 2/2011 | Belali et al. | .................... | 709/223 |
| 8,046,613 B2 * | 10/2011 | Enami et al. | ................... | 713/320 |
| 8,209,554 B2 * | 6/2012 | Parker et al. | ................... | 713/300 |
| 8,255,724 B2 * | 8/2012 | Das | ............................... | 713/323 |
| 8,280,456 B2 * | 10/2012 | Hackborn et al. | ............. | 455/574 |
| 8,285,340 B2 * | 10/2012 | Hackborn et al. | ............. | 455/567 |
| 8,296,593 B2 * | 10/2012 | Takamoto | ...................... | 713/323 |
| 8,386,817 B2 * | 2/2013 | Yamanaka et al. | ............ | 713/320 |
| 8,434,153 B2 * | 4/2013 | Sundaramurthy et al. | ...... | 726/26 |
| 2006/0242651 A1 * | 10/2006 | Zielinski et al. | ............... | 719/318 |
| 2008/0104438 A1 * | 5/2008 | Yokoyama et al. | ........... | 713/323 |
| 2010/0011285 A1 * | 1/2010 | Kawata et al. | ................. | 715/246 |
| 2011/0040989 A1 * | 2/2011 | Keyes | ........................... | 713/300 |
| 2011/0040990 A1 * | 2/2011 | Chan et al. | ..................... | 713/300 |

OTHER PUBLICATIONS

Anson, David. Give your computer insomnia. Sep. 30, 2009.*
Turnbull, Giles. 50 Mac Essentials #21: Caffeine. Nov. 12, 2010.*
Star Micronics Co. Disabling USB Port Power Off (Sleep) Mode on Windows. Apr. 2012.*
Arbona, Jorge. TLV320AIC32x6 Sleep and Standby Modes. Application Report. Apr. 2012.*
Atmel. AT03498: Low Power Modes in SAM3 Family. Application Note. 2013.*

* cited by examiner

*Primary Examiner* — Matthew D Spittle
(74) *Attorney, Agent, or Firm* — Stolowitz Ford Cowger LLP

(57) ABSTRACT

An application may receive a request to control a power mode. The power mode may be controlled based on the request and the operational status of the application. In one example, the power mode may be disabled until termination of the application. In another example, the power mode may be disabled for a specified amount of time or according to operational status of multiple applications and/or electronic pages. In yet another example, the power mode may be controlled according to an operating system power management configuration.

38 Claims, 7 Drawing Sheets

US 8,850,251 B1

METHODS, DEVICES, AND MEDIUMS ASSOCIATED WITH CONTROLLING A POWER MODE

BACKGROUND

A known computer system may use a sleep/standby mode to save battery charge. For example, the known computer system may turn off a computer screen during the sleep/standby mode after a period of user inactivity, such as not receiving a keyboard entry or mouse activity for a first amount of time. The known computer system may activate a hibernate mode when the user continues such inactivity for a second amount of time longer than the first amount of time. For example, the known computer system may power down and/or shut off additional components and may log out the user during the hibernate mode.

The known computer system may switch from the sleep/standby mode back to a previous operating mode in response to a keyboard entry or mouse activity and may revert from the hibernate mode back to the previous operating mode in response to reentering a password.

The known computer system unexpectedly may activate the sleep/standby mode and/or activate the hibernate mode while operating software applications. For example, the known computer system may turn off the computer screen during a slide presentation or while displaying a video clip. The slide presentation or the video clip may be disrupted while the user presses keys and/or moves the mouse to turn the computer screen back on and/or switch the known computer system back to the previous operating mode.

DETAILED DESCRIPTION

Figure 1:
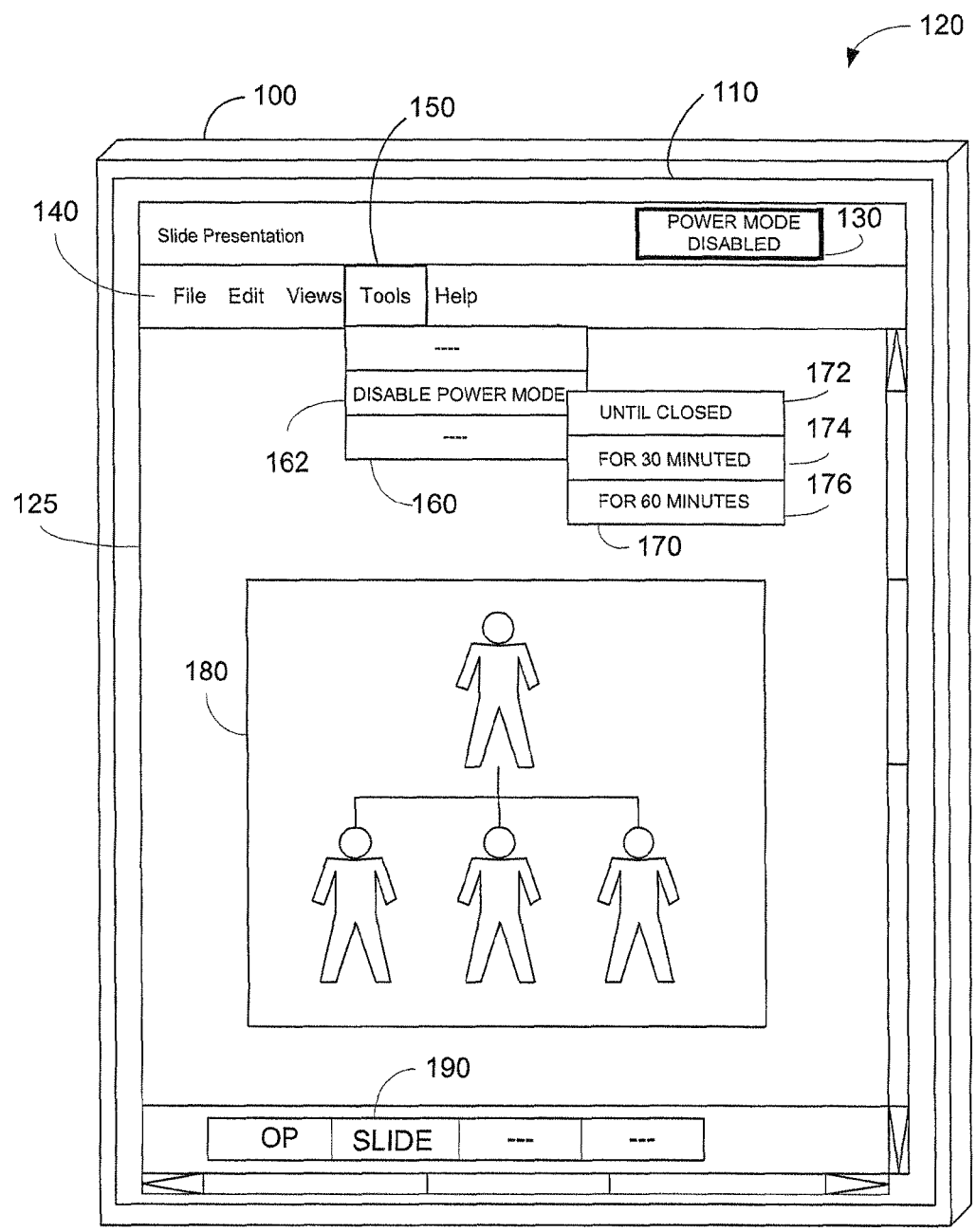
FIG. 1 depicts an example of a computer system configured to disable a power mode.

FIG. 1 depicts an example of a computer system configured to disable a power mode. Computer system 100 may comprise a personal computer, a laptop computer, a tablet computer, a hand-held device, an industrial automation system, a medical device, a household appliance, an entertainment device, a media player, e.g., an MP3 player, a smart telephone, a personal digital assistant (PDA), a gaming device, or the like, or any combination thereof. A graphical user interface (GUI) 110 may comprise one or more computer screens, or the like, or any other device configured to display information.

Computer system 100 may operate a power mode, such as a sleep mode, an energy management mode, an energy saver mode, a reduced low power mode, a hibernate mode, a security mode, an automatic log out mode, or the like, or any combination thereof. For example, computer system 100 may turn off or blank out GUI 110, operate GUI 110 at a reduced power level, operate other processing elements at a reduced power level, and/or log out a user in response to user inactivity. The user inactivity may comprise no user entries into an input device, such as a keyboard, a mouse, a touch screen, or the like, or any combination thereof, for an amount of time, e.g., a selected or an indeterminate amount of time.

A software application 120 may be opened in an electronic page 125, and in one example, may be configured to display a slide presentation 180 and a menu 140. In an example, at least one of the functions in menu 140 may disable the power mode in computer system 100. For example, application 120 may display a first drop-down menu 160 in response to selection of a tool function 150 in menu 140. Application 120 may disable the power mode in computer system 100 in response to selection of a "DISABLE POWER MODE" item 162 in dropdown menu 160. For example, application 120 may prevent the operating system in computing system 100 from turning off or blanking out GUI 110, operating GUI 110 in a reduced low power mode, and/or logging out the user in response to user inactivity.

Application 120 may disable the power mode before starting other operations and may display an icon 130 identifying the power mode as disabled. For example, application 120 may disable the power mode in response to selection of item 162 in menu 160 and then may start the slide presentation 180 in response to selection of slide presentation icon 190. Consequently, application 120 may prevent computer system 100 and/or the operating system in computer system 100 from activating the power mode and disrupting the slide presentation 180.

Application 120 may display a second dropdown menu 170 in response to selection of item 162 in menu 160. Dropdown menu 170 may include different power mode disable options, such as "UNTIL CLOSED" option 172, "FOR 30 MINUTES" option 174, and "FOR 60 MINUTES" option 176. In one example, application 120 may default to UNTIL CLOSED option 172 when none of options 172, 174, or 176 are selected.

Application 120 may disable the power mode for an indeterminate amount of time in response to selection of option 172. For example, the power mode may be disabled for as long as application 120 remains open, running, active, and/or operating in an active electronic window, or the like, or any combination thereof. In another example, application 120 may disable the power mode for a selected amount of time. For example, application 120 may disable the power mode for 30 minutes in response to selection of option 174 and may disable the power mode for 60 minutes in response to selection of option 176.

In another example, the operating system in computer system 100 may manage the power mode in conjunction with application 120. The operating system may be electronic window based, such as the Microsoft® operating system, and only may allow application 120 to disable the power mode while electronic window 125 remains active.

For example, electronic window 125 may become inactive in response to opening a second electronic window, selecting a second electronic window, or closing electronic window 125. The operating system may prevent the application from disabling the power mode and/or re-enable the power mode when electronic window 125 no longer remains active.

Figure 2:
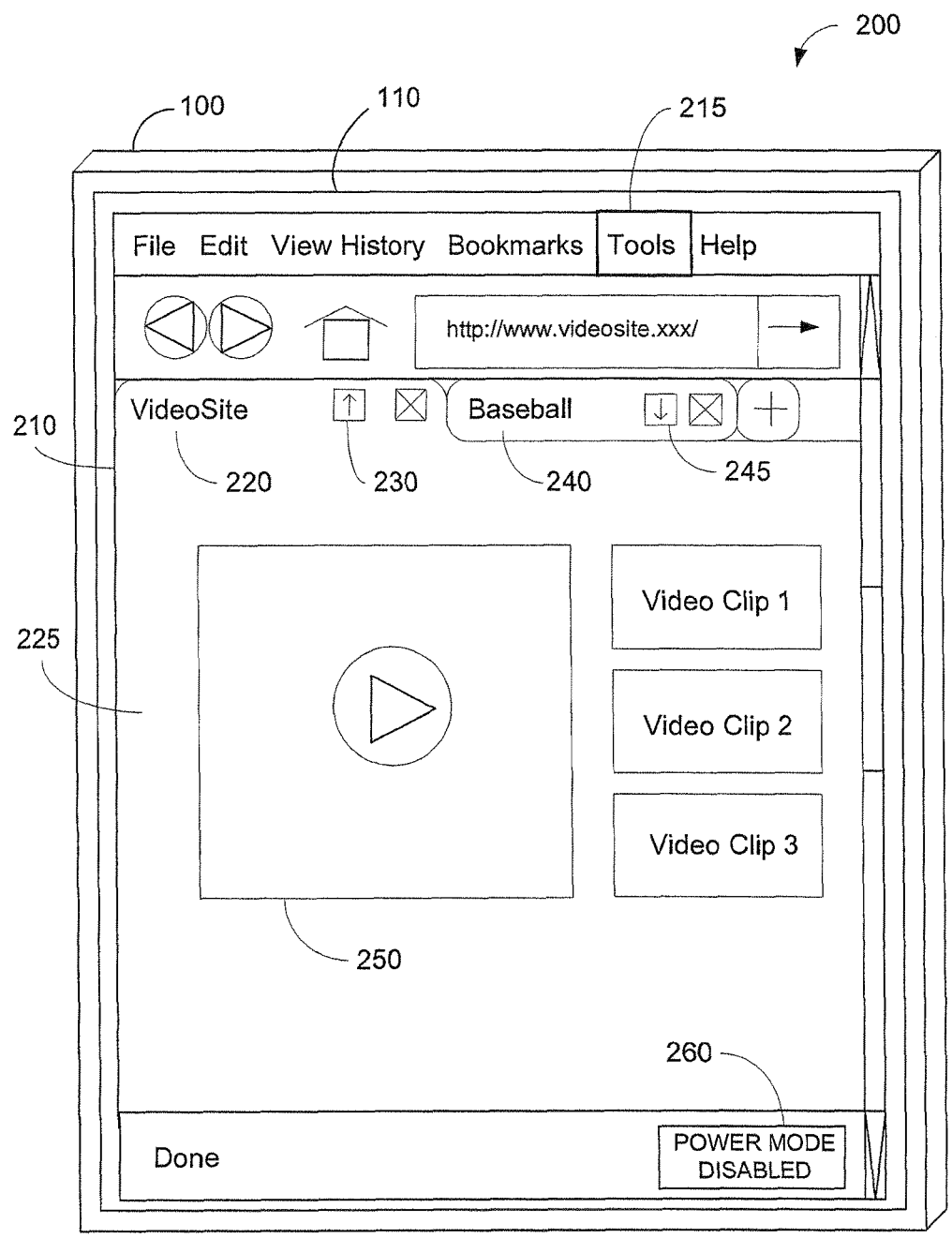
FIG. 2 depicts an example of a computer system configured to disable a power mode via a browser application.

FIG. 2 depicts an example of a computer system configured to disable a power mode via a browser application 200. Browser application 200 may be configured to open an electronic browser window 210 and to display web pages associated with different web sites, web applications, or the like, or any combination thereof. For example, browser application 200 may display a first tab 220 and a web page 225 for a video web site, and may display a second tab 240 and web page for a baseball web site.

Browser application 200 may be configured to disable the power mode in computer system 100 in response to selection of an icon 230 displayed in first tab 220 and/or in response to selection of an icon 245 displayed in second tab 240. For example, browser application 200 may disable the power mode in response to selection of icon 230 and may continue to disable the power mode while web page 225 remains open and/or active in browser application 200. The power mode may be re-enabled in response to selection of a different tab, closing web page 225, closing electronic browser window 210, and/or otherwise deactivating browser application 200.

In another example, browser application 200 may be configured to disable the power mode regardless of which web pages are open and/or active. For example, browser application 200 may disable the power mode in response to selection of a menu item in a tool function 215, as depicted in and previously described with respect to FIG. 1. In this example, the power mode may be disabled for a selected amount of time or until termination of browser application 200 occurs regardless of the web pages currently open in browser application 200.

Browser application 200 may indicate a status of the power mode in icon 230. For example, browser application 200 may display an up arrow in icon 230 to indicate disablement of the power mode and may display a down arrow in icon 230 to indicate enablement of the power mode. In another example, browser application 200 may display an icon 260 in electronic browser window 210 to indicate a status of the power mode. For example, browser application 200 may display icon 260 in response to disabling the power mode via one of tabs 220 and/or 240 or via tool function 215. The browser application 200 may remove icon 260 in response to the power mode no longer being disabled via any of tabs 220 and/or 240 or via tool function 215.

In another example, an application, such as a file management application, a document editing application, a media player application, or the like, or any combination thereof may open multiple electronic pages each displaying a different electronic file. The application may disable the power mode in response to requests received from one or more of the multiple electronic pages and may re-enable the power mode in response to closing all of the electronic pages associated with disabling the power mode.

Figure 3:
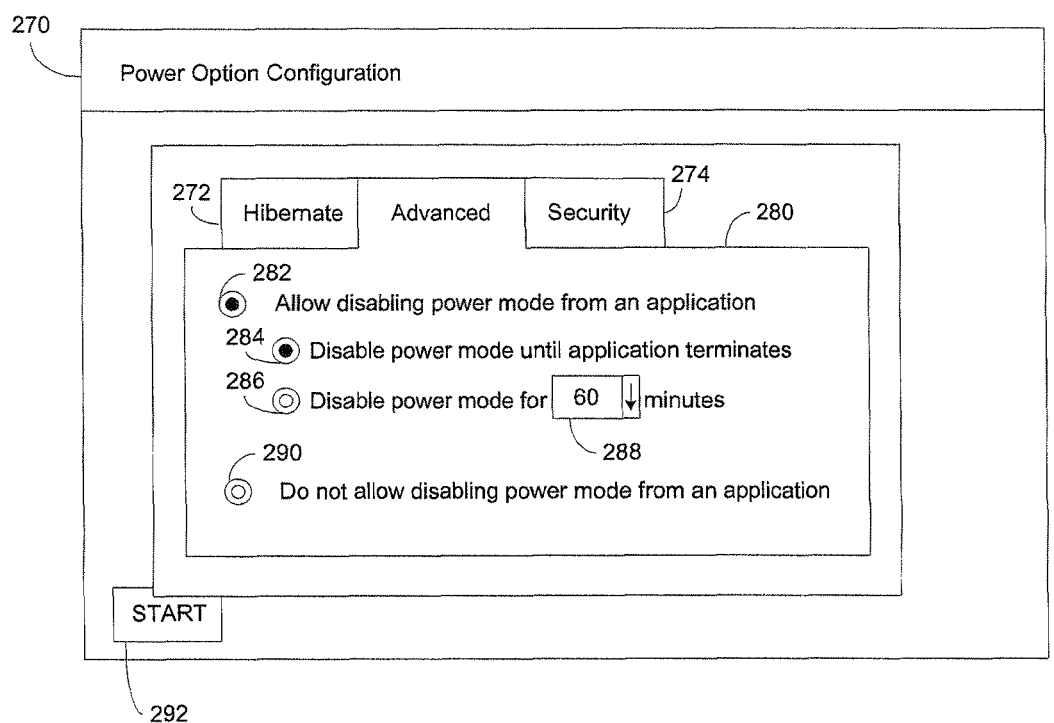
FIG. 3 depicts an example of an operating system configuration page.

FIG. 3 depicts an example of an operating system electronic configuration page 270 for managing the power mode in a computer system. In one example, the operating system may display electronic configuration page 270 in response to selection of a start icon 292 and may display multiple tabs 272, 274, and/or 280 associated with different power and/or security modes.

Tab 280 may display different electronic buttons for managing the power mode in the computer system. For example, the operating system may allow an application to disable the power mode in response to selection of electronic button 282. The operating system may prevent the application from disabling the power mode in response to selection of electronic button 290. For example, the operating system may ignore any power mode configuration data and/or power mode control messages received from the application and only may control the power mode based on the settings provided through electronic configuration page 270.

In one example, the operating system may allow the application to disable the sleep mode during different application operating states. For example, the operating system, in response to selection of electronic button 282 and/or selection of electronic button 284, may allow the application to disable the power mode until the application terminates. In another example, the operating system, in response to selection of electronic button 286, may allow the application to disable the power mode for a specific amount of time entered into field 288.

The computer system may be configured to re-enable the power mode in response to termination of the application and/or expiration of the amount of time in field 288. The power mode may remain enabled when the application reopens and/or reactivates. The power mode may be disabled a second time by the application in response to reselection of a menu item and/or icon in the application.

In another example, the application and/or the operating system may retain previous power mode settings. For example, the application during a first session may be configured to disable the power mode. The application may be closed and the power mode re-enabled. The application may be reopened in a second session and may disable the power mode again according to the power mode settings retained from the first session.

The operating system also may retain the settings from configuration page 270 between different application sessions. For example, the operating system in response to selection of electronic button 286 may allow the application to disable the power mode for 60 minutes. The operating system may allow the application to disable the power mode for 60 minutes in the first session and for 60 minutes in the second session.

The operating system may control other power modes, such as a hibernate mode associated with tab 272 and/or a security mode associated with tab 274. For example, the operating system may cause the computer system to power down additional components and/or log out a user during the hibernate mode associated with tab 272, or may activate additional security levels, such as a lock out mode or a log out mode during the security mode associated with tab 274.

The operating system may be configured to operate the hibernate mode and/or the security mode in response to selections in tab 272 and tab 274, respectively. For example, in response to selection of a first electronic button in tab 272, the operating system may allow the application to disable the hibernate mode until the application terminates. In response to selection of a second electronic button in tab 272, the operating system may prevent the application from disabling the hibernate mode. Moreover, in response to selection of a third electronic button in tab 272, the operating system may allow the application to disable the hibernate mode for a specified amount of time.

Figure 4:
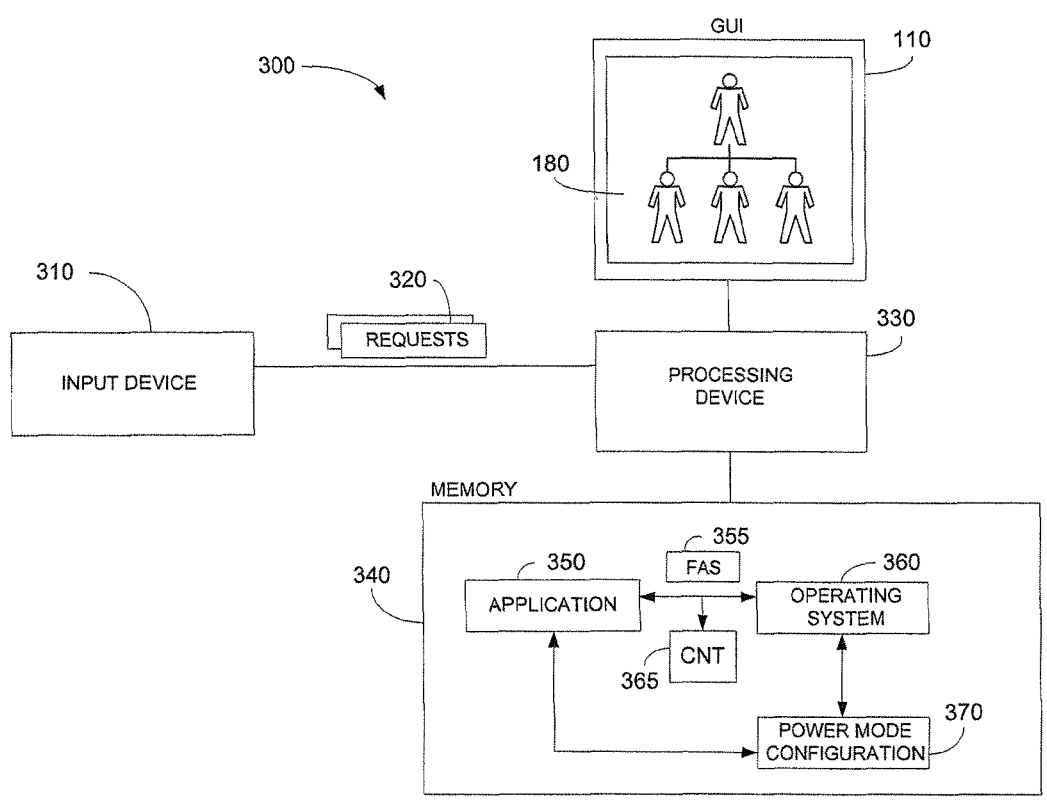
FIG. 4 depicts an example of a computer system configured to control a power mode.

FIG. 4 depicts an example of a computer system 300 configured to control a power mode. Computer system 300 may comprise an input device 310, a GUI 110, a processing device 330, and a memory 340. Computer system 300 may be a personal computer, a laptop computer, a tablet computer, a hand-held device, a network server, an industrial automation system, a medical device, a household appliance, an entertainment device, a media player, e.g., an, MP3 player, a smart telephone, a personal digital assistant (PDA), a gaming device, or the like, or any combination thereof.

Processing device 330 may comprise a programmable processor, a central processing unit (CPU), logic circuitry, a programmable logic device, or the like, or any combination thereof. Memory 340 may comprise solid state memory devices, buffers, registers, discs, or the like, or any combination therefore. Different portions of memory 340 may be internal or external to processing device 330 or may be internal or external to computer system 300. For example, a first portion of memory 340 may be integrated within processing device 330, a second portion of memory 340 may be external to processing device 300 and located in a same enclosure with processing device 330, and a third portion of memory 330 may be remotely coupled to processing device 330 via a network.

GUI 110 may comprise one or more stand-alone computer screens, or may comprise one or more computer screens incorporated into a same enclosure with processing device 330, memory 340, and/or input device 310. In one example, GUI 110 may be locally coupled to processing device 330 and in another example GUI 120 may be remotely coupled to processing device 330 via a network.

Input device 310 may comprise a keyboard, a mouse, a touch screen, a computer, or the like, or any combination thereof. In one example, input device 310 may be locally coupled to processing device 330. For example, input device 310 and processing device 330 may comprise components in a same PC or portable processing device. In another example, input device 310 may comprise part of a computer system configured to communicate with processing device 330 over a network.

Processing device 330 may be configured to execute instructions associated with a software operating system 360 and/or a software application 350. Processing device 330, application 350, and/or operating system 360 may be configured to receive requests 320 from input device 310. For example, application 350 may be a browser application, a streaming media player application, a presentation application, or the like, or any combination thereof, and requests 320 may direct application 350 to disable the power mode in computer system 300. In another example, requests 320 may determine how operating system 360 and/or processing device 330 control the power mode.

In one example, requests 320 may select menu items and/or icons in application 350 associated with controlling the power mode. In another example, requests 320 may select menu items and/or icons in an operating system configuration page displayed by operating system 360 and associated with controlling the power mode.

Application 350, operating system 360, and/or processing device 330 may create and/or modify a power mode configuration file 370 in response to requests 320, and then may control the power mode based on configuration file 370. For example, application 350 may disable the power mode by setting or modifying values in power mode configuration file 370 configured to prevent operating system 360 from initiating the power mode in response to user inactivity.

Processing device 330 may use a timer or counter 365 to start a countdown period in response to an input event. For example, operating system 360 may reset counter 365 to 20 minutes and start a new countdown period in response to detecting a keyboard entry or mouse activity via input device 310. A first power mode may be initiated when counter 365 reaches 10 minutes and a second power mode may be initiated when counter 365 reaches 0 minutes. For example, the first power mode may shut off or blank out GUI 110 and the second power mode may power down additional components in computer system 300 and/or log out a current user.

Application 350 also may disable the power mode by periodically sending fake activity signals (FASs) 355 to processing device 330 and/or operating system 360. For example, application 350 may generate FASs 355 every minute causing processing device 330 to repeatedly reset counter 365 back to 20 minutes and to prevent processing device 330 and/or operating system 360 from initiating the first power mode or the second power mode. In one example, FASs 355 may comprise synthetic key stokes, such as a simulated "esc" or "tap" key entry configured to reset counter 365 without changing a status of application 350 and/or changing information displayed in GUI 110.

Figure 5:
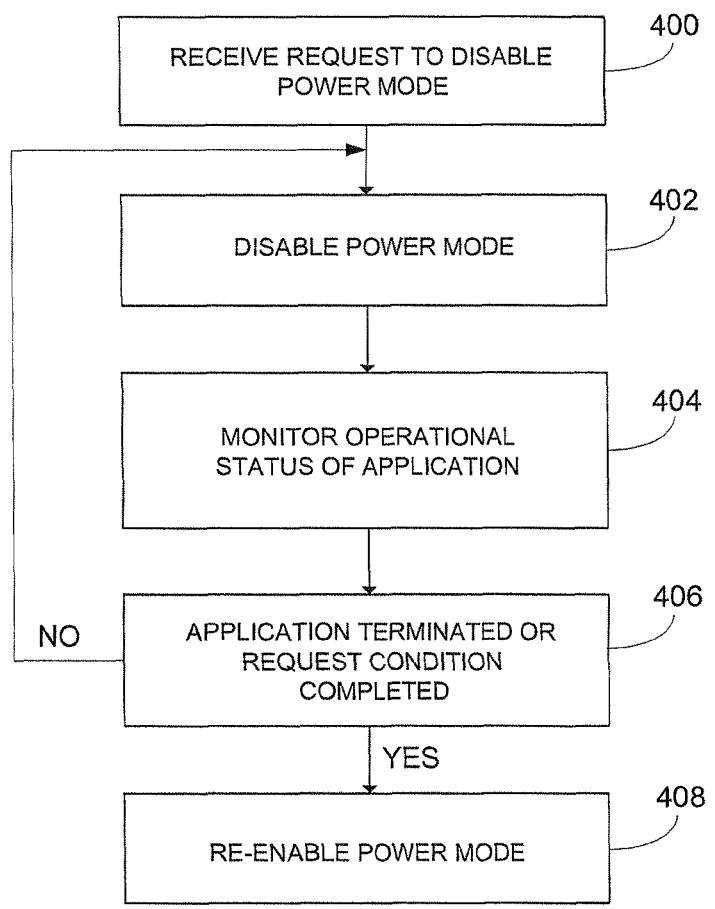
FIG. 5 depicts an example of a process for controlling a power mode based on an application state.

FIG. 5 depicts an example of a process for controlling a power mode based on a state of an application. In operation 400, a request may be received and/or associated with an application. For example, a user may select a first power mode option in the application to disable the power mode until termination of the application or may select a second power mode option in the application to disable the power mode for a selected amount of time.

In operation 402, the power mode may be disabled in response to the request. For example, the application may set values in a power mode configuration file or may generate fake activity signals configured to disable the power mode. In operation 404, the operational status of the application may be monitored, such as monitoring for termination of the application, deactivation of a window displaying the application, and/or expiration of a amount of time during operation of the application.

In operation 406, the application may be terminated and/or the condition associated with the request may be completed. For example, a user may close and/or inactivate the electronic window associated with the application and/or the amount of time selected for disabling the power mode may have expired. The power mode may be re-enabled in operation 408 in response to detection of the condition in operation 406. Otherwise, the power mode may continue to be disabled in operation 402.

Figure 6:
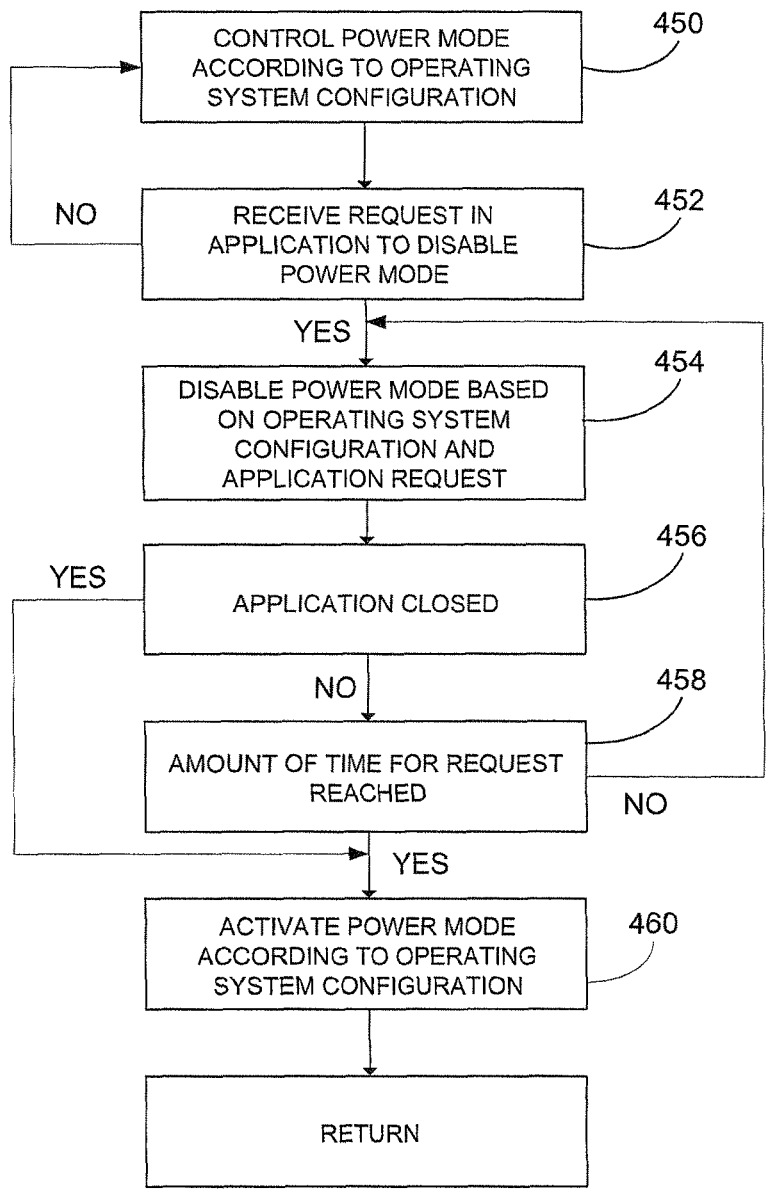
FIG. 6 depicts an example of a process for controlling a power mode based on an operating system configuration and an application state.

FIG. 6 depicts an example of a process for controlling a power mode based on an operating system configuration and a state of an application. In operation 450, the power mode may be controlled according to an operating system configuration, such as via an operating system configuration page as depicted in FIG. 3. In operation 452, an application may receive a request to disable the power mode and in operation 454 the power mode may be disabled based on the request and the operation system configuration.

The operating system configuration may operate as an override signal for the request received in operation 452. For example, the operating system configuration may prevent the application from disabling the power mode and/or may ignore any power mode disable signals or power mode configuration data received from the application. In another example, the operating system configuration may enable and/or modify the request received in operation 452. For example, the operating system may limit how long the application disables the power mode.

The power mode may remain disabled in operation 454 until the application closes in operation 456 and/or until expiration of any selected amount of time in operation 458 and then may be re-enabled according to the operating system configuration in operation 460.

Figure 7:
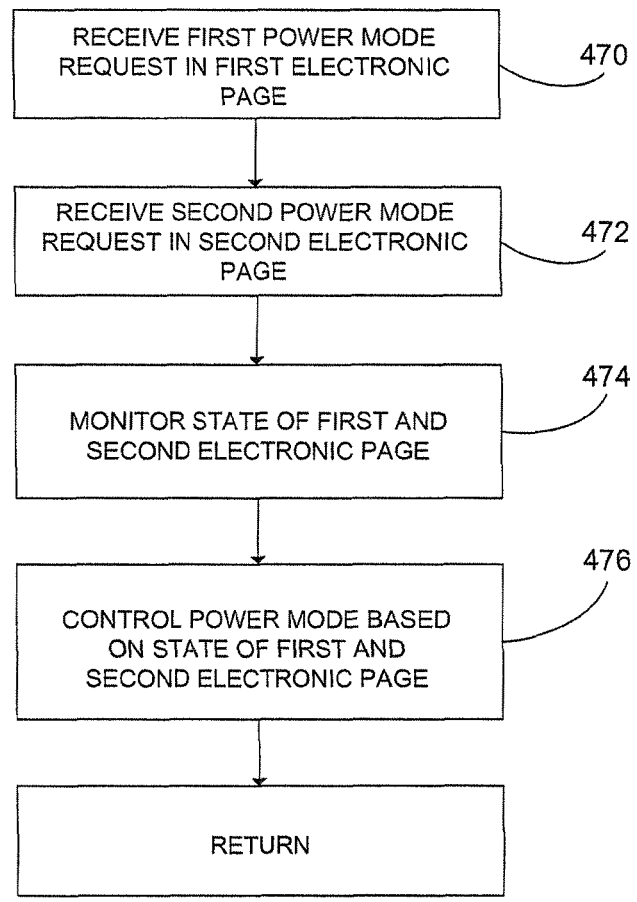
FIG. 7 depicts an example of a process for controlling a power mode based on states of multiple applications and/or electronic pages.

FIG. 7 depicts an example of a process for controlling a power mode based on states of multiple applications and/or multiple electronic pages. A first electronic page may receive a first power mode request in operation 470 and a second electronic page may receive a second power mode request in operation 472.

In one example, the first electronic page may be associated with a web browser and the second electronic page may be associated with a web page operating in the web browser. In another example, the first electronic page may comprise a first web page displayed by the web browser and the second electronic page may comprise a second web page displayed by the same web browser. In another example, the first electronic page and the second electronic page may display information associated with the same application, and in yet another example, the first electronic page and the second electronic page may display information associated with different applications.

In operation 474, the state of the first electronic page and the state of the second electronic page may be monitored. In operation 476, the power mode may be controlled based on the state of the first electronic page and the state of the second electronic page. For example, a low power operation may be disabled as long as at least one of the first electronic page or second electronic page remains active. The power mode may be re-enabled when both the first electronic page and second electronic page are terminated and/or closed.

The system and apparatus described above may use dedicated processor systems, micro controllers, programmable logic devices, or microprocessors that may perform some or all of the operations described herein. Some of the operations described above may be implemented in software and other operations may be implemented in hardware. One or more of the operations, processes, or methods described herein may be performed by an apparatus, device, or system similar to those as described herein and with reference to the illustrated figures.

The processing device may execute instructions or "code" stored in memory. The memory may store data as well. The processing device may include, but may not be limited to, an analog processor, a digital processor, a microprocessor, multi-core processor, processor array, network processor, etc. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, storage array, or portable FLASH key fob. The memory and processing device may be operatively coupled together, or in communication with each other, for example by an I/O port, network connection, etc. such that the processing device may read a file stored on the memory. Associated memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

Operating instructions or commands may be implemented or embodied in tangible forms of stored computer software (also known as a "computer program" or "code"). Programs, or code, may be stored in a digital memory that may be read by the processing device. "Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. We claim all modifications and variation coming within the spirit and scope of the following claims.

The invention claimed is:

1. A method, comprising:
receiving, by an application operated by a processing device, a request to control a power mode for the processing device, wherein the request is received in response to selection of an item in a menu displayed in the application;
activating a power mode control operation within the application in response to selection of the item in the menu; and
controlling, by the power mode control operation within the application, the power mode for the processing device based on an operational status of the application, wherein controlling the power mode comprises:
disabling the power mode for at least some amount of time while the operational status of the application is active,
re-enabling the power mode in response to the operational status of the application no longer being active, and
resetting a counter used by an operating system for initiating a low power operation by generating a fake user input.

2. The method of claim 1, wherein the operational status of the application is active when an electronic window for the application is open on a computer screen and the operational status of the application is no longer active when the electronic window is closed.

3. The method of claim 1, wherein controlling the power mode is independent of a time duration between user inputs received by the processing device.

4. The method of claim 1, wherein the request identifies an amount of time, and wherein controlling the power mode comprises disabling the power mode based on the amount of time.

5. The method of claim 1, wherein controlling the power mode comprises enabling the low power operation in response to termination of the application.

6. The method of claim 1, wherein:
the application displays an electronic window; and
controlling the power mode comprises disabling the low power operation for at least a portion of time while the electronic window is open and enabling the low power operation in response to closing the electronic window.

7. The method of claim 1, further comprising:
receiving, by an additional application operated by the processing device, an additional request to control the power mode, wherein the additional request is received in response to selection of a menu item in the additional application;
detecting, by the processing device, an operational status of the additional application; and
controlling, by the additional application, the power mode based on the additional request and the operational status of the additional application.

8. The method of claim 7, wherein the application comprises a web browser and the additional application comprises a web application operating via the web browser.

9. The method of claim 7, wherein controlling the power mode further comprises disabling the low power operation based on detecting at least one of the application or the additional application as active.

10. The method of claim 7, wherein controlling the power mode further comprises enabling the low power operation in response to closing the application and closing the additional application.

11. The method of claim 1, further comprising displaying, by the processing device, a menu for the operating system, and receiving an additional request to control the power mode in response to detecting a selection in the menu for the operating system.

12. The method of claim 1, wherein:
controlling the power mode comprises disabling the low power operation until the application is closed in response to selection of a first option in a menu, and disabling the power mode for a selected amount of time in response to selection of a second option in the menu.

13. The method of claim 1, further comprising displaying, by the processing device, an indicator in the application identifying at least one of an enabled state or a disabled state of the power mode.

14. The method of claim 1, wherein controlling the power mode further comprises modifying power mode configuration data, wherein the power mode configuration data is configured to control how the operating system operates the power mode.

15. The method of claim 1, wherein the power mode includes at least one of a sleep mode or a hibernate mode.

16. The method of claim 1, wherein the power mode includes a log out mode.

17. The method of claim 1, wherein the application comprises a slide presentation application.

18. The method of claim 1, wherein the application comprises a media player application.

19. A method, comprising:
receiving, by a processing device, a request to control a power mode, wherein the request is associated with an application;
detecting, by the processing device, an operational status of the application; and
controlling, by the processing device, the power mode based on the request and the operational status of the application, wherein the application operates in a browser page displayed via a web browser, receiving the request comprises detecting a selection of a browser tab in the browser page, and controlling the power mode comprises disabling a low power operation of the power mode based on the selection of the browser tab and enabling the low power operation in response to closing the browser page.

20. The method of claim 19, further comprising:
receiving, by the processing device, an additional request to control the power mode, wherein the additional request is associated with an additional application operating in an additional browser page displayed via the web browser, and wherein receiving the additional request comprises detecting a selection of an additional browser tab in the addition browser page;
disabling, by the processing device, the low power operation based on the selection of the additional browser tab; and
enabling, by the processing device, the low power operation in response to closing the additional browser page.

21. The method of claim 19, further comprising:
receiving, by the processing device, an override signal in response to an operating system menu selection; and
overriding, by the processing device, the request to control the power mode based on the override signal.

22. The method of claim 21, wherein overriding the request comprises enabling the request to control the power mode.

23. The method of claim 21, wherein overriding the request comprises disabling the request from controlling the power mode.

24. The method of claim 21, wherein the override signal identifies a time duration and wherein controlling the power mode comprises controlling the power mode based on the time duration.

25. An apparatus, comprising:
logic circuitry configured to:
receive an input selected from a menu displayed in an application, wherein the input is associated with operation of an energy saver mode;
identify a state of the application associated with the input;
disable the energy saver mode based on the state of the application indicating the application is active;
enable the energy saver mode based on the state of the application indicating the application is not active, wherein the application operates an electronic page and wherein the energy saver mode is disabled for at least a portion of time while the electronic page is open and the energy saver mode is enabled in response to closing the electronic page;
receive an additional input from an operating system control panel; and
control the energy saver mode based on the additional input, wherein the additional input is configured to disable the input selected from the menu.

26. The apparatus of claim 25, wherein the input identifies a time duration and control of the energy saver mode is based on the time duration.

27. The apparatus of claim 25, wherein disabling the energy saver mode is independent of an amount of time lapse between user inputs.

28. The apparatus of claim 25, wherein the logic circuitry is further configured to:
receive a different input selected from a menu displayed in an additional application;
identify a state of the additional application associated with the different input; and
control the energy saver mode based on the different input and the state of the additional application.

29. The apparatus of claim 28, wherein the application comprises a web browser and the additional application comprises a web application operating via the web browser.

30. The apparatus of claim 25, wherein the energy saver mode is disabled in response to selection of the electronic page and the energy saver mode is enabled in response to deselection of the electronic page.

31. The apparatus of claim 25, wherein the logic circuitry is further configured to control a log-in mode based on the state of the application.

32. The apparatus of claim 25, wherein the input is received in response to a selection of an option in the menu.

33. The apparatus of claim 25, wherein the application comprises a slide presentation application.

34. The apparatus of claim 25, wherein the application comprises a media player application.

35. An apparatus, comprising:
  logic circuitry configured to:
    receive an input selected from a menu displayed in an application, wherein the input is associated with operation of an energy saver mode;
    identify a state of the application associated with the input;
    disable the energy saver mode based on the state of the application indicating the application is active;
    enable the energy saver mode based on the state of the application indicating the application is not active, wherein the application operates an electronic page and wherein the energy saver mode is disabled for at least a portion of time while the electronic page is open and the energy saver mode is enabled in response to closing the electronic page;
    receive an additional input selected from a menu displayed in an additional application;
    identify a state of the additional application associated with the additional input; and
    control the energy saver mode based on the additional input and the state of the additional application, wherein the application operates in a first browser page displayed via a web browser and the additional application operates in a second browser page displayed via the web browser, and wherein control of the energy saver mode comprises disabling the energy saver mode while at least one of the first browser page and the second browser page are open and enabling the sleep mode in response to closing the first browser page and closing the second browser page.

36. A computer-readable memory device having instructions stored thereon that, in response to execution by a processing device, cause the processing device to perform operations comprising:
  receiving a request to configure an energy management mode for an application;
  setting an energy management configuration for the application based on the request;
  opening an electronic page with the application;
  based on the energy management configuration, disabling the energy management mode for at least a portion of time in response to opening the electronic page; and
  based on the energy management configuration, enabling the energy management mode in response to closing the electronic page, wherein disabling the energy management mode comprises disabling a sleep mode based on an operational state of the application, and wherein enabling the energy management mode comprises activating the sleep mode based an amount of time since a last detected user input.

37. The computer-readable memory device of claim 36, further comprising instructions, that when executed, result in:
  receiving an additional request to configure the energy management mode for an operating system, wherein the additional request is received from an operating system control panel;
  setting an additional energy management configuration based on the additional request; and
  controlling the energy management mode based on the additional energy management configuration, wherein controlling the energy management mode is only based on the additional energy management configuration when the application is not active.

38. The computer-readable memory device of claim 37, wherein the additional energy management configuration enables the energy management configuration.

* * * * *